United States Patent
Guido et al.

(10) Patent No.: US 9,664,125 B2
(45) Date of Patent: May 30, 2017

(54) METHOD AND SYSTEM FOR TRANSIENT FUEL CONTROL

(71) Applicant: Ford Global Technologies, LLC, Dearborn, MI (US)

(72) Inventors: Samuel Guido, Dearborn, MI (US); Ed Badillo, Flat Rock, MI (US); Dev Saberwal, Canton, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 961 days.

(21) Appl. No.: 13/961,569

(22) Filed: Aug. 7, 2013

(65) Prior Publication Data
US 2015/0046065 A1     Feb. 12, 2015

(51) Int. Cl.
 *F02D 41/00*  (2006.01)
 *F02D 19/08*  (2006.01)

(52) U.S. Cl.
 CPC ..... *F02D 41/0025* (2013.01); *F02D 41/0027* (2013.01); *F02D 19/081* (2013.01); *F02D 2200/0611* (2013.01); *Y02T 10/36* (2013.01)

(58) Field of Classification Search
 CPC ....... Y02T 10/36; Y02T 10/44; F02D 41/402; F02D 41/0025; F02D 41/3011; F02D 19/02; F02D 19/021; F02D 19/06; F02D 19/0602; F02D 19/0607; F02D 19/061; F02D 19/0639; F02D 19/0642; F02D 19/0647; F02D 19/081
 See application file for complete search history.

(56) References Cited

U.S. PATENT DOCUMENTS

| | | | |
|---|---|---|---|
| 7,703,435 B2 | 4/2010 | Surnilla et al. | |
| 8,307,790 B2 | 11/2012 | Leone et al. | |
| 8,340,886 B2 | 12/2012 | Nenmeni et al. | |
| 2002/0195081 A1* | 12/2002 | McGee | F02D 41/045 123/299 |
| 2005/0188945 A1* | 9/2005 | Dickerson | F02D 41/3017 123/299 |
| 2007/0215112 A1* | 9/2007 | Brehob | F02D 17/02 123/431 |
| 2012/0143480 A1 | 6/2012 | Pursifull | |
| 2013/0199499 A1 | 8/2013 | Pursifull | |

OTHER PUBLICATIONS

Badillo, Ed et al., "Method and System for Engine Control," U.S. Appl. No. 13/754,667, filed Jan. 30, 2013, 39 pages.
Badillo, Ed et al., "Method and System for Engine Control," U.S. Appl. No. 13/841,611, filed Mar. 15, 2013, 38 pages.
Glugla, Chris Paul et al., "Variable Displacement Engine Control System and Method," U.S. Appl. No. 13/968,252, filed Aug. 15, 2013, 67 pages.
Glugla, Chris Paul et al., "Variable Displacement Engine Control System and Method," U.S. Appl. No. 13/968,240, filed Aug. 15, 2013, 65 pages.

\* cited by examiner

*Primary Examiner* — Erick Solis
*Assistant Examiner* — Anthony L Bacon
(74) *Attorney, Agent, or Firm* — Julia Voutyras; McCoy Russell LLP

(57) ABSTRACT

Methods are provided for reducing transient fuel issues in a multi-fuel engine system. When transitioning from co-fueling with a first fuel split ratio to co-fueling with an alternate fuel split ratio, the change in fuel split ratio is gradually ramped in over multiple engine cycles. This reduces combustion stability issues and the disturbance potential of a wholesale fuel change.

24 Claims, 4 Drawing Sheets

Co-fueling approach → 200

| Speed/Load range | Gasoline | CNG | 1/lambda | Torque ratio | Tq relative to gasoline |
|---|---|---|---|---|---|
| Low speed (1000 to 1500rpm) High load | 0% | 100% | 1.00 | 1.00 | 120% |
| Med. speed (1500 to 3000rpm) High load | 0% | 100% | 1.00 | 1.00 | 95% |
| Torque band (3000 to 4500rpm) High load | 70% | 30% | 1.30 | 1.00 | 110% |
| Power band (4500 to 6000rpm) High load | 15% | 85% | 1.10 | 1.00 | 100% |
| Power band (4500 to 6000rpm) High load, Cat. Protect | 15% | 85% | 0.70 | 1.00 | 90% |

Conventional gasoline approach → 210

| Speed/Load range | Gasoline | CNG | 1/lambda | Torque ratio | Tq relative to gasoline |
|---|---|---|---|---|---|
| Low speed (1000 to 1500rpm) High load | 100% | 0% | 1.00 | 0.80 | 100% |
| Med. speed (1500 to 3000rpm) High load | 100% | 0% | 1.00 | 1.00 | 100% |
| Torque band (3000 to 4500rpm) High load | 100% | 0% | 1.30 | 0.80 | 100% |
| Power band (4500 to 6000rpm) High load | 100% | 0% | 1.30 | 0.80 | 100% |
| Power band (4500 to 6000rpm) High load, Cat. Protect | 100% | 0% | 1.30 | 0.80 | 100% |

Conventional CNG approach → 220

| Speed/Load range | Gasoline | CNG | 1/lambda | Torque ratio | Tq relative to gasoline |
|---|---|---|---|---|---|
| Low speed (1000 to 1500rpm) High load | 0% | 100% | 1.00 | 1.00 | 120% |
| Med. speed (1500 to 3000rpm) High load | 0% | 100% | 1.00 | 1.00 | 95% |
| Torque band (3000 to 4500rpm) High load | 0% | 100% | 1.10 | 1.00 | 75% |
| Power band (4500 to 6000rpm) High load | 0% | 100% | 1.10 | 1.00 | 90% |
| Power band (4500 to 6000rpm) High load, Cat. Protect | 0% | 100% | 0.70 | 1.00 | 70% |

FIG. 2

METHOD AND SYSTEM FOR TRANSIENT FUEL CONTROL

FIELD

The present application relates to adjusting a rate at which fuel is changed when transitioning between co-fueling profiles in a multi-fuel vehicle.

BACKGROUND/SUMMARY

Alternate fuels have been developed to mitigate the rising prices of conventional fuels and for reducing exhaust emissions. For example, natural gas has been recognized as an attractive alternative fuel. For automotive applications, natural gas may be compressed and stored as compressed natural gas (CNG) in cylinders at high pressure. As another example, alcohol and alcohol-containing fuel blends may be used as an alternative fuel for automotive applications. Various engine systems may be used with alcohol fuels and CNG fuels, utilizing various engine technologies and injection technologies that are adapted to the specific physical and chemical properties of the alternative fuels. Based on engine operating conditions, an engine control system may adjust a fuel injection profile of a multi-fuel system to take advantage of the specific properties of the available fuels. This may include operating with either one of the fuels, or using a co-fueling approach wherein both fuels are simultaneously injected. Co-fueling can provide the advantages of each fuel and may be serendipitously advantageous over either fuel during selected conditions.

One example multi-fuel system is described by Surnilla et al. in U.S. Pat. No. 7,703,435. Therein, an engine is configured to operate on CNG, gasoline, or a mixture of both. Fuel is selected for operating the engine during particular operating conditions based on the amount of fuel available in each fuel storage tank as well as based on the type and attributes of the available fuel. For example, vehicle fuel economy and range can be extended by selecting a particular fuel during high driver demand. As another example, engine emissions can be improved by reserving a particular fuel for engine starting conditions. Another approach is shown by Leone et al. in U.S. Pat. No. 8,307,790. Therein, the engine is operated with a gaseous fuel generated via reformation and a liquid fuel including an alcohol fuel blend. During conditions when a transition from liquid fuel to gaseous fuel is requested, the gaseous fuel injection is ramped in initially at a low rate. Once the gaseous fuel composition has been determined, the fuel injected is ramped in at a higher rate.

However the inventors herein have recognized potential issues with such approaches. As an example, transient fuel issues may occur. These issues may be exacerbated when transitioning between co-fueling modes. The transient fuel issues may be complex to track due to the use of multiple fuels and multiple injection technologies. For example, transient fuel issues experienced when transitioning from direct injection of a first liquid fuel to direct injection of a first and second gaseous fuel may be substantially different from those experienced when transitioning from direct injection of a first liquid fuel to direct injection of a first fuel and port injection of a second gaseous fuel. Furthermore, due to transient fuel effects, when transitioning from co-fueling with a first fuel split to co-fueling with a different fuel split, there is a risk of not matching the engine control correctly with the actual fuel present in the cylinder. The variability in the fuel chemistry can make the fuel transition even more difficult. For example, the quality of fuel (e.g., CNG fuel) can vary radically from tank fill to tank fill. As a result, a rapid shift in fuel split can compromise the control system's ability to compensate for transient fuel issues, resulting in torque losses, abnormal combustion (e.g., knock or misfire), and degraded fuel economy. Due to the transient fuel issues, a controller may not enable co-fueling even during conditions where co-fueling provides serendipitous advantages over usage of either fuel individually. As a result, co-fueling opportunities may be missed.

In one example, some of the above issues may be addressed by a method comprising: transitioning from operating an engine with a first split ratio of a first fuel and a second fuel to operating with a second, different split ratio, a rate of change in split ratio during the transitioning limited per engine cycle. In this way, by limiting the rate of fuel split change allowed at each engine cycle, transient fuel issues incurred during co-fueling can be reduced.

As an example, an engine may be configured with a multi-fuel system so as to operate on a first, liquid fuel, such as gasoline, and a second, gaseous fuel, such as CNG. During selected operating conditions, the engine may be operated with at least some CNG and at least some gasoline injected into the engine cylinders to provide benefits that minimize the consumption of liquid fuel while meeting the torque demand. For example, during conditions of a torque band (where engine speed is in the range of 3000-4500 rpm and engine load is high), the engine may be co-fueled with a fuel split of 70% gasoline and 30% CNG and an overall combustion air-fuel ratio that is 30% rich so as to meet the torque demand while also allowing spark to be maintained at MBT. As another example, during conditions of a power band (where engine speed is in the range of 4500-6000 rpm and engine load is high), the engine may be co-fueled with a fuel split of 15% gasoline and 85% CNG (and an overall combustion air-fuel ratio that is 10% rich) so that a small amount of gasoline at a smaller amount of richness, in addition to the CNG, can restore full power, while maintaining spark at MBT. When transitioning from co-fueling at the first fuel split ratio used in the torque band conditions to co-fueling at the second fuel split ratio used in the power band conditions, a controller may limit the rate at which the fuel split ratio is changed. Specifically, instead of transitioning from the first fuel split ratio of 70% gasoline and 30% CNG to the second fuel split ratio of 15% gasoline and 85% CNG substantially immediately (e.g., over a single engine cycle), the controller may limit the change to a threshold percentage per engine cycle to reduce potential disturbances from the wholesale change. The rate at which the split ratio is changed at each engine cycle may be limited based on engine operating conditions such as engine temperature, MAP, fuel volatility, fuel availability, change in injection type, etc. As an example, the controller may gradually increment the CNG ratio by 5% over each engine cycle while correspondingly decreasing the gasoline ratio by 5% until the desired fuel split ratio is achieved.

In this way, transient fuel effects incurred in a multi-fuel system when transitioning between co-fueling modes can be reduced. In addition, it may be easier to compensate for the reduced transient fuel effects using engine controls (e.g., throttle control, spark control, etc.). By reducing the transient effects, the use and advantages of a co-fueling approach during engine operation can be extended over a wider range of operating conditions. As such, this improves fuel economy. In addition, degraded cylinder combustion and abnormal cylinder combustion events arising due to the transient fuel effects are reduced, improving overall engine performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 2 shows example maps depicting the torque benefits from co-fueling the engine system of FIG. 1.

DETAILED DESCRIPTION

Figure 1:
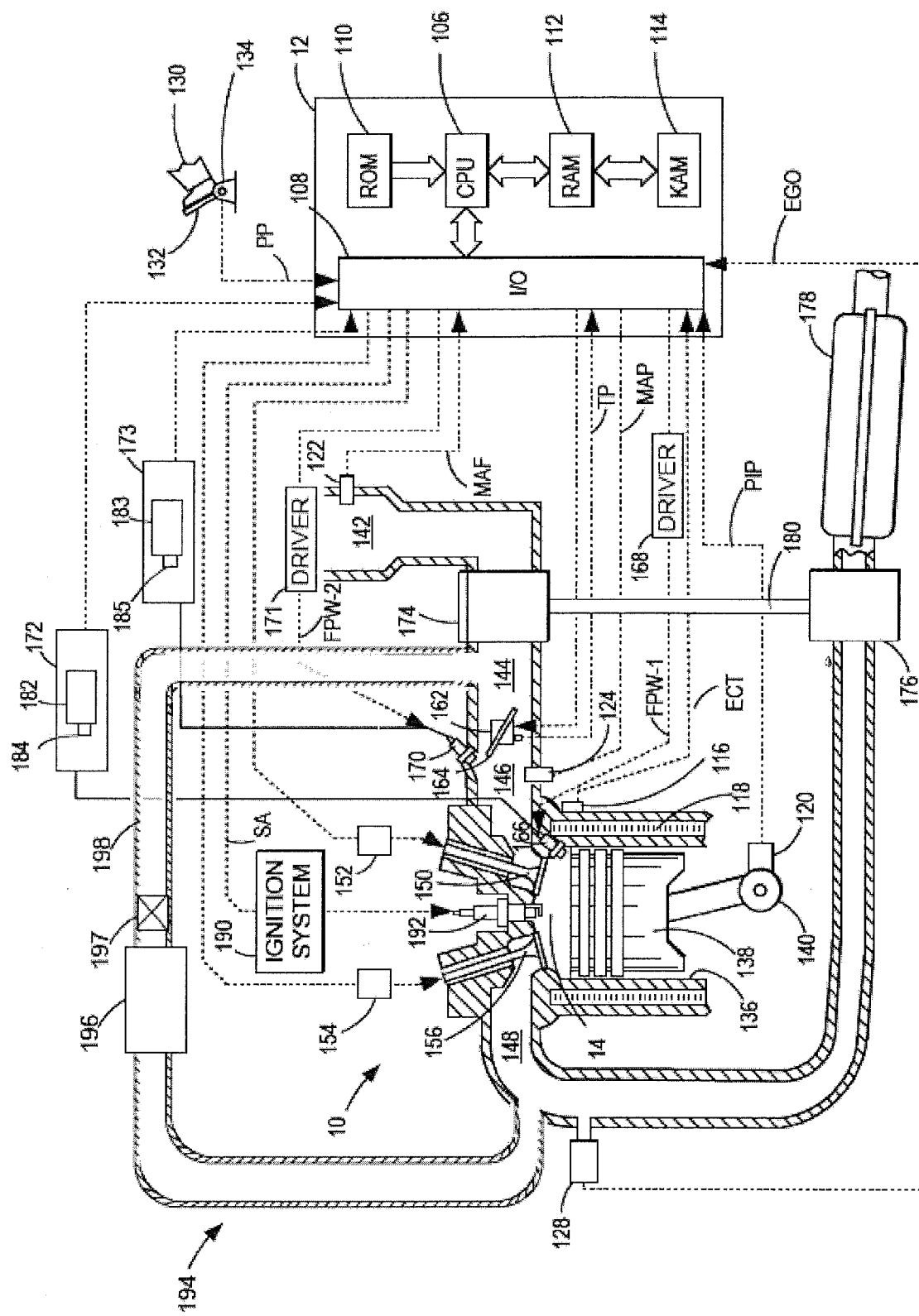
FIG. 1 shows a schematic depiction of a multi-fuel engine system configured to operate with a liquid fuel and a gaseous fuel.

Methods and systems are provided for improving fuel transitions in a multi-fuel engine system, such as the system of FIG. 1. During a fuel transition, a controller may limit a rate at which fuel change occurs. For example, the controller may perform a control routine, such as described in FIG. 3, to limit a rate of change in split ratio per engine cycle when transitioning from co-fueling the engine with a first split ratio to co-fueling the engine with a second, different split ratio. An example co-fueling transition is described herein with reference to FIG. 4. In this way, transient fuel issues in a multi-fuel engine system are reduced and co-fueling benefits (FIG. 2) are extended.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or may be alternatively provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof. Engine 10 may include an exhaust gas recirculation (EGR) system indicated generally at 194. EGR system 194 may include an EGR cooler 196 disposed along the EGR conduit 198. Further, the EGR system may include an EGR valve 197 disposed along EGR conduit 198 to regulate the amount of exhaust gas recirculated to the intake manifold 144.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing timing and/or lift amount of the respective intake and exhaust valves. The position of intake valve 150 and exhaust valve 156 may be determined by respective valve position sensors (not shown). The valve actuators may include electric valve actuation or cam actuation, or a combination thereof. In the example of cam actuation, each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

In some embodiments, each cylinder of engine 10 may include a spark plug 192 for initiating combustion. Ignition system 190 can provide an ignition spark to combustion chamber 14 via spark plug 192 in response to a spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Fuel may be delivered to fuel injector 166 from first fuel system 172, which may be a liquid (e.g., gasoline, ethanol, or combinations thereof) fuel system, including a fuel tank, fuel pumps, and a fuel rail. In one example as shown in FIG. 1, fuel system 172 may include a fuel tank 182 and a fuel sensor 184, for example a liquid level sensor, to detect the storage amount in the fuel tank 182. Alternatively, fuel may be delivered by a single stage fuel pump at lower pressure, in which case the timing of the direct fuel injection may be more limited during the compression stroke than if a high pressure fuel system is used.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 by a second fuel system 173, which may be a high pressure fuel system, including a fuel tank, a fuel pump, and a fuel rail. In one example as shown in FIG. 1, the fuel system 173 may include a pressurized gas fuel tank 183, and a fuel pressure sensor 185 to detect the fuel pressure in the fuel tank 183. Note that a single driver 168 or 171 may be used for both fuel injection systems, or multiple drivers, for example driver 168 for fuel injector 166 and driver 171 for fuel injector 170, may be used, as depicted. The fuel system 173 may be a gaseous fuel system. For example, the gaseous fuels may include CNG, hydrogen, LPG, LNG, etc. or combinations thereof. It will be appreciated that gaseous fuels, as referred to herein, are fuels that are gaseous at atmospheric conditions but may be in liquid form while at high pressure (specifically, above saturation pressure) in the fuel system. In comparison, liquid fuels, as referred to herein, are fuels that are liquid at atmospheric conditions.

It will be appreciated that while the depicted embodiment is configured to deliver one fuel via direct injection and another fuel via port injection, in still further embodiments, the engine system may include multiple port injectors wherein each of the gaseous fuel and the liquid fuel is delivered to a cylinder via port injection. Likewise, in other embodiments, the engine system may include multiple direct injectors wherein each of the gaseous fuel and the liquid fuel is delivered to a cylinder via direct injection.

The delivery of the different fuels may be referred to as a fuel type, such that the fuel type may be varied by injection relatively more or less of the liquid fuel compared with the gaseous fuel, or vice versa.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal, MAP, from MAP sensor 124. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 120, which is also used as an engine speed sensor, may produce a predetermined number of equally spaced pulses every revolution of the crankshaft.

As described above, FIG. 1 shows only one cylinder of a multi-cylinder engine. As such, each cylinder may similarly include its own set of intake/exhaust valves, fuel injector(s), spark plug, etc.

As elaborated herein with reference to the tables of FIG. 2, an engine controller may co-fuel the cylinder by injecting each of a first, gaseous fuel such as CNG to the engine cylinder (e.g., via port injector 170) and a second, liquid fuel such as gasoline to the engine cylinder (e.g., via direct injector 166) to meet engine torque demands. A split ratio (or fuel distribution) of the first fuel relative to the second fuel may be based on engine operating conditions. Further, as engine speed-load conditions change, the split ratio may be revised. The co-fueling approach may provide substantial benefits. For example, the co-fueling approach may enable the engine to meet the operator's power demand while leveraging benefits based on the unique properties of the injected fuels. These may include additional cylinder cooling and/or exhaust cooling benefits, which in turn result in torque benefits. While the example of FIG. 2 describes the co-fueling benefits of combined usage of gasoline and CNG, it will be appreciated that in alternate embodiments, co-fueling benefits may be achieved through the use of other fuel combinations, such as a combination of different alcohol fuel blends.

Turning to FIG. 2, torque benefits achieved at different engine speed-load regions through the use of a co-fueling approach, wherein a cylinder is fueled with each of gasoline and CNG (depicted at table 200), is compared to a conventional gasoline only fueling approach (depicted at table 210) as well as a CNG only fueling approach (depicted at table 220).

Each table lists details about engine speed-load regions in the first column. The next two columns depict a fueling approach including a fuel split between gasoline and CNG where the approach includes co-fueling. The fourth column depicts an equivalence ratio (as determined by 1/lambda). The fifth column depicts a torque ratio, which is an indication of spark timing. The last column depicts a torque achieved relative to gasoline only. As such, this is an indication of a torque benefit or torque penalty achieved through the use of the corresponding fueling approach.

As can be seen by comparing tables 200 and 210, during conditions of low engine speed (in the range of 1000-1500 rpm) and high load, while an engine coolant temperature is elevated (e.g., hotter than a threshold temperature) and also while an air charge temperature is elevated (e.g., hotter than a threshold temperature), the conventional gasoline only fueling approach relies on the use of spark retard to reduce or avoid knock and pre-ignition (see torque ratio of 0.8 at table 210 which indicates that spark is retarded to provide 80% of available torque). In comparison, the co-fueling approach enables the same cooling effect to be achieved without the use of spark retard (see torque ratio of 1.0 at table 200 which indicates that spark is substantially at MBT).

During conditions of medium engine speed (in the range of 1500-3000 rpm) and high load, the co-fueling approach is not substantially different from the conventional CNG only fueling approach in addressing exhaust heating.

During conditions of a torque band (where engine speed is in the range of 3000-4500 rpm) and high load, as can be seen by comparing tables 200, 210, and 220, the co-fueling approach provides substantial torque benefits. Specifically, the conventional CNG only fueling approach provides exhaust cooling at the expense of a relatively large torque penalty (see torque output of 75% relative to gasoline at table 220) while the conventional gasoline only fueling approach achieves the same exhaust cooling at the expense of spark retard (see torque ratio of 0.8 at table 210). The co-fueling approach uses a small amount of gasoline to meet the torque deficit while also allowing spark to be maintained at MBT. In addition, the co-fueling approach provides a 110% torque output relative to gasoline only, allowing exhaust cooling to be achieved without affecting engine torque output.

During conditions of a power band (where engine speed is in the range of 4500-6000 rpm) and high load, as can be seen by comparing tables 200, 210, and 220, the co-fueling approach again provides substantial torque benefits. Specifically, the conventional CNG only fueling approach provides exhaust cooling at the expense of running at a rich limit of CNG (10% rich as indicated by equivalence ratio of 1.10 at table 220) while incurring a torque penalty (see torque output of 90% relative to gasoline at table 220). The conventional gasoline only fueling approach achieves the same exhaust cooling at the expense of running 30% rich (see equivalence ratio of 1.30 at table 210) and at the expense of spark retard (see torque ratio of 0.8 at table 210). The co-fueling approach uses a small amount of gasoline at a smaller amount of richness, in addition to the CNG, to restore full power, while maintaining spark at MBT. That is, no torque penalty is incurred with the small gasoline consumption.

During conditions of a power band (where engine speed is in the range of 4500-6000 rpm) and high load, and when the catalyst needs to be protected, as can be seen by comparing tables 200, 210, and 220, the co-fueling approach again provides substantial torque benefits. Specifically, the conventional CNG only fueling approach provides exhaust cooling at the expense of running at a lean limit of CNG (30% lean as indicated by equivalence ratio of 0.70 at table 220) while incurring a torque penalty (see torque output of 70% relative to gasoline at table 220). The conventional gasoline only fueling approach achieves the same exhaust cooling at the expense of running 30% rich (see equivalence ratio of 1.30 at table 210) and at the expense of spark retard (see torque ratio of 0.8 at table 210). The co-fueling approach uses a small amount of gasoline at a smaller amount of richness, in addition to the CNG, to restore full power, while maintaining spark at MBT. That is, no torque penalty is incurred with the small gasoline consumption.

In this way, co-fueling enables the attributes of each of a gaseous fuel and a liquid fuel in a multi-fuel engine system to be leveraged. By providing stoichiometric cylinder operating using a gaseous fuel such as CNG while enriching the cylinder using a liquid fuel such as gasoline, exhaust overheating may be addressed without incurring torque losses and without requiring spark retard. By using a combination of the gaseous fuel and the liquid fuel, the flammability limits of the fuels can be widened while also improving knock limits. By taking advantage of the wider flammability limits, combustion stability limits may be increased during the enrichment. In other words, co-fueling serendipitously provides advantages not achieved through the use of either fuel alone.

As illustrated at FIG. 2, based on engine speed-load conditions, the engine may be co-fueled with gasoline and CNG but with a different fuel split ratio having, for example, a lower (or higher) percentage of CNG and a higher (or lower) percentage of gasoline. As elaborated with reference to FIG. 3, when transitioning from a first co-fueling injection profile (or mode) to a second co-fueling injection profile (or mode), the revised split ratio may be gradually ramped in. For example, instead of transitioning wholesale or substantially immediately (e.g., over a single engine cycle) from 30% CNG injection to 85% CNG injection, the controller may limit the change to 5% per engine cycle such that the transition from 30% CNG to 85% CNG is ramped in over 10-12 engine cycles. The limiting of the rate may be based on engine conditions such as the engine temperature, MAP, relative volatility of the fuels, etc. By limiting the rate of split ratio change during the transition between co-fueling modes, transient fuel effects from the change in fuel ratio, as well as any variability in individual fuel composition can be reduced, and/or better addressed. In addition, combustion stability during the transition is improved.

Figure 3:
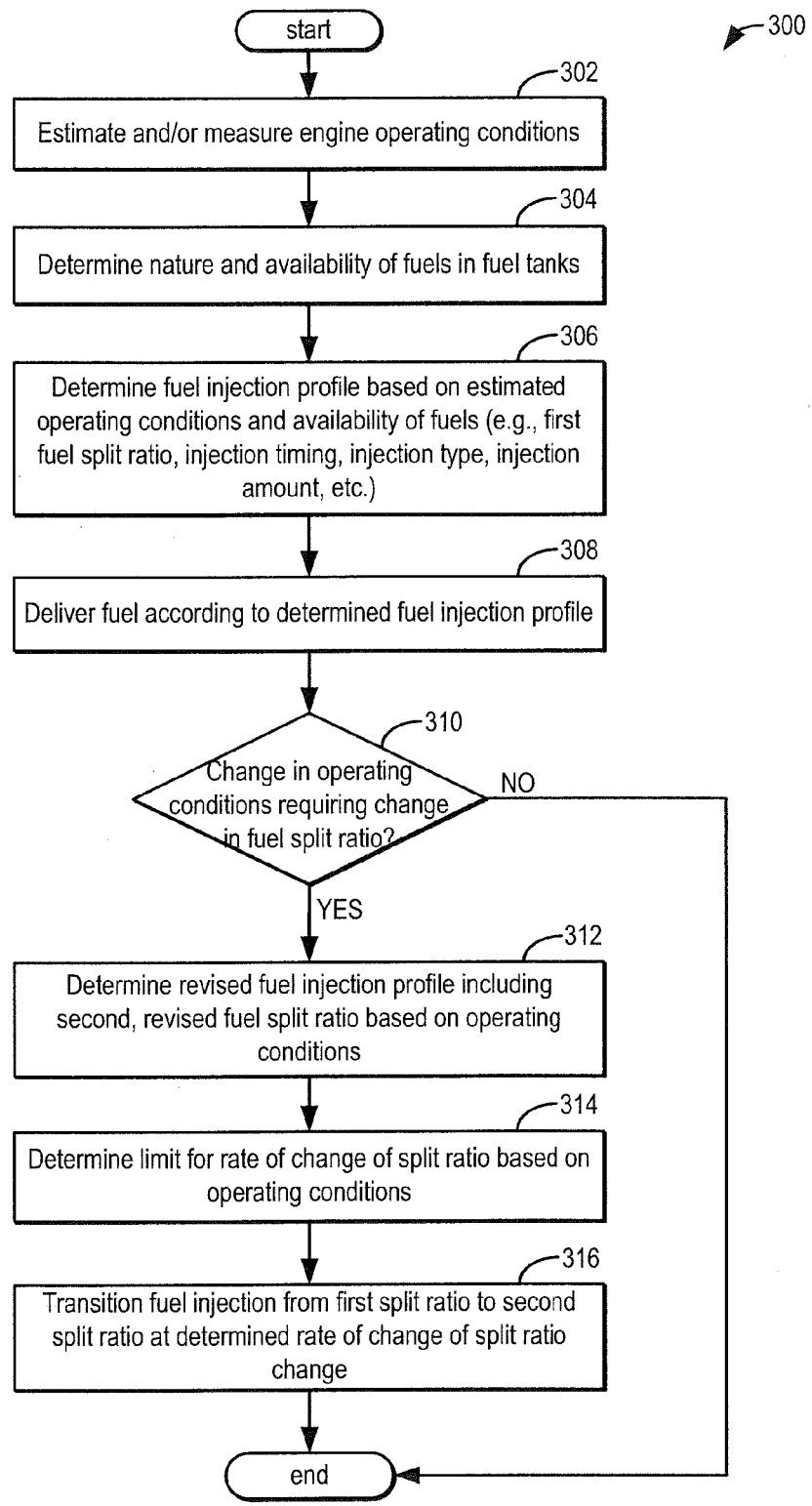
FIG. 3 shows an example flowchart for limiting a rate of change in fuel split ratio when transitioning between fuel injection profiles.

Now turning to FIG. 3, an example routine 300 is shown for transitioning between co-fueling injection profiles in a multi-fuel engine system by gradually ramping up one fuel and gradually ramping down the other fuel over multiple engine cycles.

At 302, the routine includes estimating and/or measuring engine operating conditions. These may include, for example, engine speed, engine temperature, exhaust catalyst temperature, boost level, MAP, MAF, etc. At 304, the nature and availability of fuels in the fuel tanks of the multi-fuel engine system may be determined. For example, output of fuel tank fuel level sensors may be used to estimate the availability of fuel in each fuel tank. As another example, it may be determined whether the gaseous fuel available is CNG, LPG, hydrogen, etc. As yet another example, the alcohol content of the liquid fuel may be estimated so as to determine the composition of the liquid fuel available (e.g., whether the liquid fuel is E10, E50, E85, M85, etc.). The stoichiometric fuel-air ratio of the gaseous fuel or the liquid fuel may be recalled after learning it from previous operation with that fuel. A re-fill would justify a re-learn. Gasoline may be diluted with alcohol. CNG may be diluted with nitrogen.

At 306, based on the estimated engine operating conditions and the determined availability of fuels in the engine's fuel systems, a fuel injection profile may be determined. This may include determining a fuel injection amount, number of injections, timing of injection(s), split ratio (e.g., when co-fueling), injector duty cycle, fuel injection pressure, etc. The fuel injection profile may include, for example, an amount of a first, liquid fuel (such as gasoline or an alcohol blend such as E85) and/or an amount of a second, gaseous fuel (such as CNG) that is injected into an engine cylinder so as to operate the cylinder at stoichiometry (or an alternate desired air-fuel ratio). In one example, the engine may be operated with injection of only the first, liquid fuel, wherein an amount of the first fuel injected into the engine cylinder is adjusted based on intake air received in the cylinder so as to operate the engine with a stoichiometric combustion air-fuel ratio. Herein, the first liquid fuel may be delivered to the cylinder as a direct injection. In another example, the engine may be operated with injection of only the second, gaseous fuel, wherein an amount of the second fuel injected into the engine cylinder is adjusted based on intake air received in the cylinder so as to operate the engine with a stoichiometric combustion air-fuel ratio. Herein, the second gaseous fuel may be delivered to the cylinder as a port injection. In still another example, the engine cylinder may be co-fueled with at least some of the first liquid fuel and at least some of the second gaseous fuel injected into the cylinder with the amounts of the first and second fuel adjusted based on intake air received in the cylinder so as to operate the engine with a stoichiometric combustion air-fuel ratio. A split ratio of the first fuel to the second fuel may be based on the operating conditions to leverage the specific properties (e.g., charge cooling properties) of each fuel. In one example, the second gaseous fuel may be delivered to the cylinder as a port injection while the first liquid fuel is delivered as a direct injection.

As discussed at FIG. 2, co-fueling may provide various benefits, including advantages not achieved through the use of either fuel alone. For example, when co-fueling a cylinder with gasoline and CNG, the octane of CNG can be used to meet the torque demand without need for spark retard while the wider flammability limit of gasoline (e.g., in the range of 0.6 to 1.5 lambda) can be used to cool the exhaust. By using this combination, a smaller degree of enrichment is needed to cool the engine than would have otherwise been required if the engine were operating with only gasoline, thereby improving fuel economy. By reducing the need for spark retard (which would have otherwise been required if the engine were operating with only gasoline), torque losses and power losses are also reduced. By also reducing the need for throttle adjustments (which would have otherwise been required to reduce the exhaust temperature), torque losses due to lower intake air charge are also reduced.

At 308, fuel may be delivered to the engine cylinders according to the determined fuel injection profile. In the depicted example, based on the operating conditions, the engine may be operated with a first split ratio of the first fuel and the second fuel. The first split ratio may include a relatively higher amount of the first, liquid fuel and a relatively smaller amount of the second, gaseous fuel.

At 310, it may be determined if there is a change in operating conditions necessitating a change in fuel injection profile (including a change in the fuel split ratio). For example, due to a change in engine speed-load conditions, and/or torque demand, the fuel injection profile may need to be changed. Alternatively, due to low fuel levels in the fuel tank of one of the fuels, the fuel injection profile may need to be changed to reduce consumption of the soon-to-be depleted fuel. If no change in fuel injection profile is required, the routine may end.

At 312, a revised fuel injection profile including a second, revised fuel split ratio may be determined. The second, revised fuel injection profile may include, for example, a revised fuel split, revised fuel injection type, revised fuel injection amount(s) and timing(s). As such, when transitioning from a first fuel injection profile to a second fuel injection profile, transient fuel issues may occur. In particular, when transitioning from co-fueling an engine cylinder with a first split ratio to co-fueling the engine cylinder with a second, different split ratio, there is a risk that the fuel injection profile delivered does not match the requested fuel injection profile due to transient fuel effects, variability in fuel chemistry, etc. These transient effects can become more complex when the fuel change is accompanied by a change in fuel injection type, such as when changing from at least direct injecting a portion of a first fuel combination to at least port injecting a portion of a second fuel combination. Even if engine control actions are used to compensate for the transient fuel effects, combustion stability can become degraded during (and immediately following) the transition. In some conditions, the disturbance potential of the wholesale fuel change may not be sufficiently compensated. The inventors herein have recognized that the transient fuel effects can be reduced by limiting the rate at which the fuel transition occurs. In other words, instead of transitioning from the first fuel injection profile to the second fuel injection profile substantially immediately (e.g., over a single engine cycle), the transitioning may be performed over a number of engine cycles (e.g., over multiple engine cycles).

Thus at 314, a limit for the rate of change of split ratio may be determined based on one or more engine operating conditions. As discussed, the rate of change in split ratio may be determined for when transitioning between fuel injection profiles in a multi-fuel engine system so as to limit the degree of transitioning allowed per engine cycle. As an example, the rate of change may be limited based on engine temperature, the rate increased as the engine temperature increases. Specifically, since a warmer engine has fewer liquid fuel transient effects, the warmer the engine, the faster the fuel transition can be enabled. Thus, when the engine temperature is warmer, the transition from the first split ratio to the second split ratio can be enabled over fewer engine cycles, and with the change over each engine cycle being of a larger magnitude. In comparison, when the engine temperature is cooler, the transition from the first split ratio to the second split ratio can be enabled over more engine cycles, and with the change over each engine cycle being of a smaller magnitude.

As another example, the rate of change may be limited based on fuel volatility, the rate increased as the fuel volatility of the first fuel and/or second fuel increases. Specifically, the greater the volatility of the liquid fuel, the fewer the liquid fuel transient effects experienced. Consequently, the fuel transition can be enabled faster when using high volatility fuels. In particular, a faster transition can be enabled when the fuel volatility of the fuel being transitioned to is higher. In comparison, the transition in either direction may be slowed when non-volatile fuel or high MAP is present.

As a further example, the rate of change may be limited based on MAP, the rate increased as MAP decreases. Specifically, the lower the manifold pressure, the fewer the transient fuel effects. Thus, at lower MAP, such as when the engine is operating without boost, the rate may be increased and the transitioning can be performed over fewer engine cycles. In comparison, at higher MAP, such as when the engine is operating with boost, the rate may be decreased and the transitioning can be performed over more engine cycles.

As yet another example, the rate of change may be limited based on an indication of refueling. A recent refill causes uncertainty in fuel composition. Until that fuel composition is learned (via use) the transition rate needs to be slow. For example, if the fuel being transitioned to was recently refilled in the fuel tank, the composition and content of the fuel may not be precisely and reliably known. As such, tank fill-to-tank fill variations in the composition of a given fuel can lead to transient fuel effects and combustion stability issues. Thus, if the fuel being transitioned to was recently refilled, the rate of change may be decreased and the transition may be performed slower, and over a larger number of engine cycles. This allows the engine controller to learn the fuel's composition and adjust engine control actions accordingly. The limit may be likewise adjusted during conditions where there is uncertainty in the fuel composition leading to an uncertainty in the fuel's stoichiometric fuel-air ratio). Further still, the transition rate may be limited or slowed if there is uncertainty in the fuel's volatility.

The limit may be further based on the directionality of the change in split ratio. For example, the rate of change applied when the split ratio changes from a higher proportion of gaseous fuel to a lower proportion of gaseous fuel may be different from the rate of change applied when the split ratio changes from a lower proportion of gaseous fuel to a higher proportion of gaseous fuel. In other words, if little of the fuel being injected gets stored (i.e. has transient effects), a faster transition rate can be enabled.

Further still, the rate of change may be limited based on fuel level. In particular, during conditions when the change in fuel injection profile is triggered in response to a fuel limit (e.g., a given fuel becoming depleted or a fuel level of a given fuel reaching a lower threshold), the transition may be performed without delay (e.g., substantially immediately).

At 316, the routine includes transitioning from operating the engine with the first split ratio of the first fuel to the second fuel, to operating the engine with the second split ratio of the first fuel to the second fuel, with the rate of change in split ratio limited per engine cycle, as determined above.

In one example of the routine of FIG. 3, the first fuel is a liquid fuel such as gasoline and the second fuel is a gaseous fuel such as CNG. However, in an alternate example, each of the first and second fuels may be liquid fuels. Further still, at least one of the first fuel and the second fuel may be an alcohol fuel or fuel blend. Further still, one fuel may be gasoline injected via port fuel injection and the second fuel may be the same gasoline fuel injected via direct injection.

In this way, during a first condition, a controller may transition an engine from operating with a first, higher split ratio of a first liquid fuel to a second gaseous fuel to operating the engine with a second, lower split ratio over a single engine cycle while during a second condition, the controller may transitioning the engine from operating with the first split ratio to operating the engine with the second split ratio over a plurality of engine cycles. The first higher split ratio may include a higher proportion of the first fuel relative to the second fuel while the second lower split ratio may include a lower proportion of the first fuel relative to the second fuel. In one example, during the first condition, a fuel level of the first fuel may be lower than a threshold while during the second condition, a fuel level of the first fuel is higher than the threshold. As another example, during the first condition, an engine temperature may be higher than a threshold temperature, while during the second condition, the engine temperature may be lower than the threshold temperature. As a further example, the first condition may include an indication of fuel tank refilling while the second condition may not include an indication of fuel tank refilling. As still another example, during the first condition, the engine may be operating boosted (with higher MAP) while during the second condition, the engine may be operating un-boosted (with lower MAP). In addition, a number of engine cycles over which the transitioning is performed during the second condition may be adjusted based on a fuel volatility of the first and second fuels.

Figure 4:
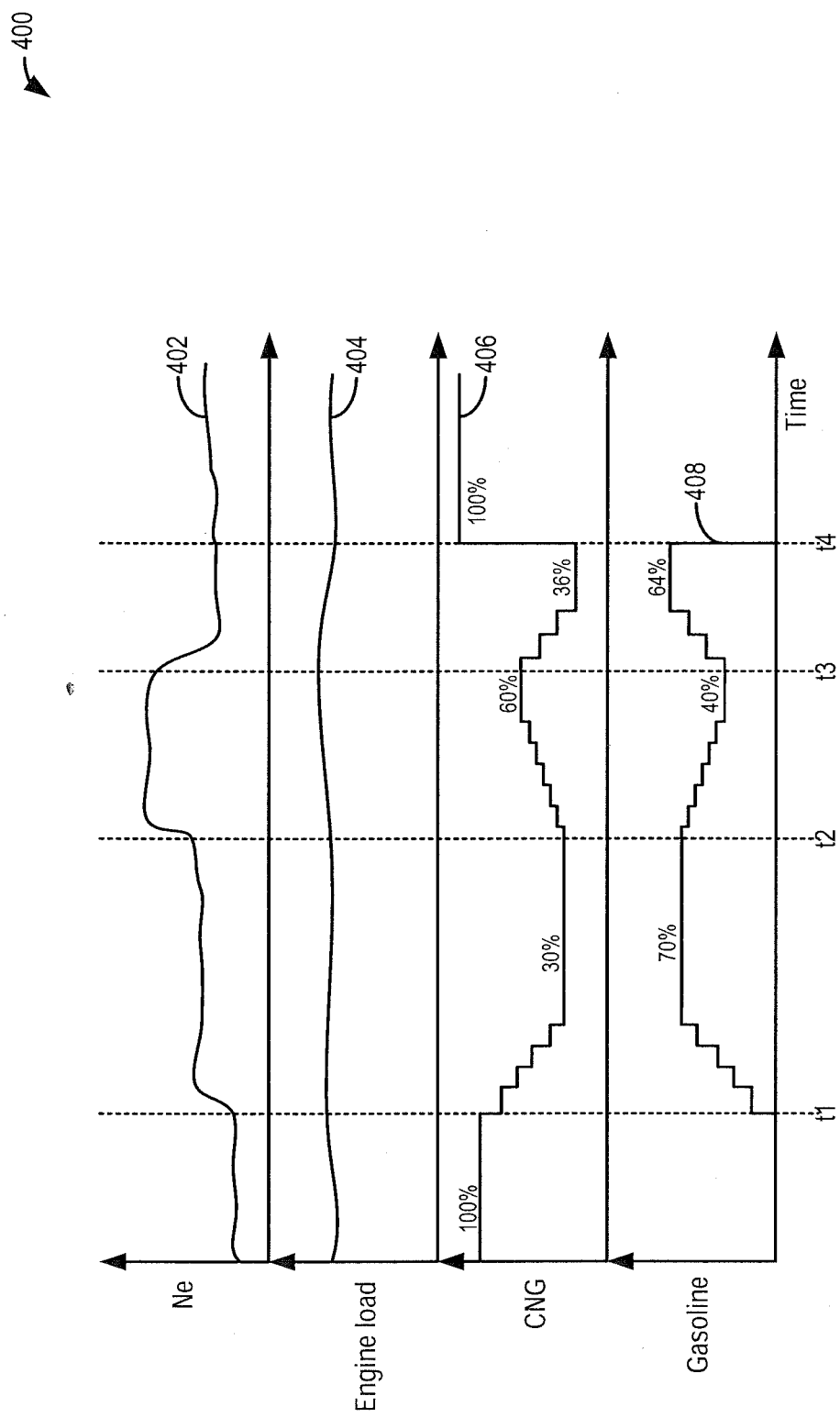
FIG. 4 shows an example transition between fuel injection profiles having different fuel split ratios.

Now turning to FIG. 4, example fuel transitions in a multi-fuel system are shown. In particular, map 400 depicts engine speed at plot 402, engine load at plot 404, CNG fuel injection (as % of total fuel injection amount) at plot 406, and gasoline fuel injection (as % of total fuel injection amount) at plot 408.

Prior to t1, the engine may be operating at high engine load (plot 404) and low engine speed conditions (plot 402). During these conditions, the engine may be fueled with 100% CNG and 0% gasoline (plot 408). At t1, due to a change in operating conditions, engine speed may increase and it may be more efficient to operate the engine with 30% CNG and 70% gasoline. Thus, at t1, the controller may start transitioning the engine from operating with the first split ratio of the first liquid fuel (gasoline) to the second gaseous fuel (CNG), herein 0% gasoline to 100% CNG, to the second, different split ratio (herein 70% gasoline to 30% CNG) with a rate of the transition limited based on engine operating conditions including engine temperature and fuel volatility. The rate may be increased as the engine temperature increases such that the transitioning occurs over a fewer number of engine cycles, and the rate may be decreased as the engine temperature decreases such that the transitioning occurs over a larger number of engine cycles. Likewise, the rate may be increased as a fuel volatility of the fuel(s) being transitioned to increases such that the transitioning occurs over a fewer number of engine cycles, and the rate may be decreased as the fuel volatility of the fuel(s) being transitioned to decreases such that the transitioning occurs over a larger number of engine cycles.

In the depicted example, the rate of transition at t1 is limited to 14% per engine cycle. Thus, the actual gasoline split may be ramped in as follows over consecutive cycles: 0%, 14%, 28%, 44%, 56%, 70%, 70%, 70%, and so on. Likewise, the actual CNG split may be ramped down as follows over consecutive cycles: 100%, 86%, 72%, 58%, 44%, 30%, 30%, 30%, and so on. The engine may then continue to be operated with the 70% gasoline-30% CNG fuel split ratio until t2 when a change in operating conditions necessitates a further change in fuel split ratio.

At t2, due to a change in torque demand, engine speed may further increase. At the new engine operating conditions, it may be more efficient to operate the engine with 60% CNG and 40% gasoline. Here, the split ratio transition rate may be determined to be 5%. Thus, at t2, the controller may transition the engine from a first split ratio of gasoline: CNG (70:30) being used prior to t2, to a second, revised split ratio of gasoline:CNG (40:60) over multiple engine cycles. The actual CNG split may be ramped in as follows over consecutive cycles: 30%, 35%, 40%, 45%, 50%, 55%, 60%, 60%, 60% and so on. Likewise, the actual gasoline split may be ramped down as follows over consecutive cycles: 70%, 65%, 60%, 55%, 50%, 45%, 40%, 40%, 40% and so on. The engine may then continue to be operated with the 40% gasoline-60% CNG fuel split ratio until t3 when a change in operating conditions necessitates a further change in fuel split ratio.

At t3, due to a change in operating conditions, engine speed may decrease and it may be more efficient to operate the engine with 36% CNG and 64% gasoline. As such, the fuel split transitions requested at t2 may have been of a first directionality wherein the proportion of CNG was increased and the proportion of gasoline was correspondingly decreased. In comparison, the fuel split transition requested at t3 may be on a second, opposite directionality wherein the proportion of CNG is decreased and a proportion of gasoline is correspondingly increased. Thus, at t3, an alternate split ratio transition rate may be determined. In the present example, the split ratio transition rate at t3 may be determined to be 8%. In an alternate example, the transition rate determined at t3 may be similar to the transition rate determined at t1 since both transitions are of a common directionality. Thus, at t3, the controller may transition the engine from a first split ratio of gasoline:CNG (40:60) being used prior to t3, to a second, revised split ratio of gasoline:CNG (64:36) over multiple engine cycles. The actual CNG split may be ramped down as follows over consecutive cycles: 60%, 52%, 44%, 36%, 36%, 36% and so on. Likewise, the actual gasoline split may be ramped in as follows over consecutive cycles: 40%, 48%, 56%, 64%, 64%, 64% and so on. Since the transition rate used at t3 is higher than the transition rate used at t1 or t2, the overall change from one fuel split ratio to another is accomplished over fewer engine cycles at t3. The engine may then continue to be operated with the revised fuel split ratio until t4.

At t4, a fuel level of the gasoline fuel may drop below a threshold and refueling may be required. This fuel limiting may necessitate a change in fuel split ratio. Specifically, the proportion of gasoline usage may need to be reduced and the proportion of CNG usage may need to be increased, at least until an indication of gasoline refueling is received. Accordingly, at t4, the fuel split ratio may be changed to 100% CNG and 0% gasoline. In addition, since the transitioning is requested in response to a fuel limit, a wholesale transition may be enabled. Specifically, instead of stepwise or gradually transitioning from 64% gasoline: 36% CNG usage to 100% CNG usage over multiple engine cycles with the rate of change limited per engine cycle, the transition may occur substantially immediately, over a single engine cycle. Thus following t4, the engine may be operated with CNG only.

In this way, by slow walking a fuel split during a fuel transition, the disturbance potential of a wholesale fuel change can be limited. This allows transient fuel issues resulting from unexpected variations in fuel proprieties to be reduced. In addition, degraded cylinder combustion and abnormal cylinder combustion events arising due to the transient fuel effects are reduced. Overall, engine performance is improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   transitioning from operating an engine with a first split ratio of a first fuel and a second fuel to operating with a second, different split ratio, a rate of change in split ratio during the transitioning being determined from engine operating conditions and limited per engine cycle, the first fuel being a different fuel than the second fuel, the limiting further based on a directionality of the change in split ratio.

2. The method of claim 1, wherein the rate of change is limited based on engine temperature, the rate increased as the engine temperature increases.

3. The method of claim 1, wherein the rate of change is limited based on fuel volatility, the rate increased as the fuel volatility of the first fuel and/or second fuel increases, fuel volatility being determined from a composition of the first and second fuels.

4. The method of claim 1, wherein the rate of change is limited based on MAP, the rate increased as MAP decreases.

5. The method of claim 1, wherein the rate of change is limited based on an indication of refueling, the rate decreased in response to an indication of refueling of the first fuel or the second fuel.

6. The method of claim 1, wherein the rate of change is limited based on an injection type of the first fuel relative to an injection type of the second fuel.

7. The method of claim 1, wherein the rate of change is limited based on fuel level, the rate increased in response to a fuel level of the first fuel or second fuel being lower than a threshold.

8. The method of claim 1, wherein one of the first fuel and the second fuel is an alcohol fuel or fuel blend.

9. A method, comprising:
   transitioning from operating an engine with a first split ratio of a first fuel and a second fuel to operating with a second, different split ratio, a rate of change in split ratio during the transitioning being determined form engine operating conditions and limited per engine cycle, wherein the first fuel is a liquid fuel and the second fuel is a gaseous fuel, and wherein the rate of change applied when the split ratio changes from a higher proportion of gaseous fuel to a lower proportion of gaseous fuel is different from the rate of change applied when the split ratio changes from a lower proportion of gaseous fuel to a higher proportion of gaseous fuel.

10. The method of claim 9, wherein the first fuel is gasoline and the second fuel is CNG.

11. A method for an engine, comprising:
determining a first split ratio and a second, different split ratio based on engine operating conditions; and
transitioning an engine from operating with the first split ratio of a first liquid fuel to a second gaseous fuel to operating the engine with the second, different split ratio in response to engine operating conditions, a rate of the transitioning based on engine operating conditions including engine temperature and fuel volatility.

12. The method of claim 11, wherein the rate is increased as the engine temperature increases such that the transitioning occurs over a fewer number of engine cycles, and wherein the rate is decreased as the engine temperature decreases such that the transitioning occurs over a larger number of engine cycles.

13. The method of claim 12, wherein the rate is increased as a fuel volatility of the first and second fuels increases such that the transitioning occurs over a fewer number of engine cycles, and wherein the rate is decreased as the fuel volatility of the first and second fuels decreases such that the transitioning occurs over a larger number of engine cycles.

14. The method of claim 13, wherein the rate is further adjusted based on MAP, the rate increased as MAP decreases.

15. The method of claim 11, wherein determining the first split ratio and the second split ratio is also based on a composition of the first and second fuels.

16. The method of claim 11, further comprising comparing a composition of the first fuel and the second fuel to a history of fuels used to determine an air fuel ratio.

17. The method of claim 11, wherein the transition is in response to engine operating conditions including at least one of engine speed, torque demand, and fuel availability.

18. The method of claim 11, wherein the rate is determined based on proportions of fuel comprising the first split ratio and the second split ratio.

19. A method comprising:
determining compositions of a first liquid fuel and a second gaseous fuel;
during a first condition, transitioning an engine from operating with a first, higher split ratio of the first liquid fuel to the second gaseous fuel to operating the engine with a second, lower split ratio over a single engine cycle; and
during a second condition, transitioning the engine from operating with the first split ratio to operating the engine with the second split ratio over a plurality of engine cycles determined using the composition of the first and second fuels.

20. The method of claim 19, wherein during the first condition, a fuel level of the first fuel is lower than a threshold, and wherein during the second condition, a fuel level of the first fuel is higher than the threshold.

21. The method of claim 20, wherein during the first condition, an engine temperature is higher than a threshold temperature, and wherein during the second condition, the engine temperature is lower than the threshold temperature.

22. The method of claim 21, wherein the first condition includes an indication of fuel tank refilling, and wherein the second condition does not include an indication of fuel tank refilling.

23. The method of claim 22, wherein during the first condition, the engine is operating boosted, and wherein during the second condition, the engine is operating unboosted.

24. The method of claim 19, wherein the plurality of engine cycles is based on a fuel volatility of the first and second fuels.

* * * * *